(12) United States Patent
Greiner et al.

(10) Patent No.: US 10,119,626 B2
(45) Date of Patent: Nov. 6, 2018

(54) DYNAMIC LIP SEAL AND MOVEABLE SEAL RECESS FOR PRESSURE BALANCE CONTROL OF ELECTRICALLY OPERATED VALVE

(71) Applicant: Rausch & Pausch GmbH, Selb (DE)

(72) Inventors: Herwig Greiner, Neuenmarkt (DE); Werner Schieweck, Thierstein (DE)

(73) Assignee: Rausch & Pausch GmbH, Selb (DE)

( * ) Notice: Subject to any disclaimer, the term of this patent is extended or adjusted under 35 U.S.C. 154(b) by 7 days.

(21) Appl. No.: 15/220,632

(22) Filed: Jul. 27, 2016

(65) Prior Publication Data

US 2017/0030475 A1   Feb. 2, 2017

(30) Foreign Application Priority Data

Jul. 28, 2015   (DE) .......................... 10 2015 112 328

(51) Int. Cl.
*F16K 31/06*   (2006.01)
*F16K 39/02*   (2006.01)
(Continued)

(52) U.S. Cl.
CPC ............ *F16K 31/0655* (2013.01); *F16F 9/34* (2013.01); *F16K 31/0658* (2013.01);
(Continued)

(58) Field of Classification Search
CPC ............ F16K 31/0693; F16K 31/0655; F16K 31/0675; F16K 27/029; F16K 39/022;
(Continued)

(56) References Cited

U.S. PATENT DOCUMENTS 3,599,931 A * 8/1971 Hanson ............... F16K 31/1221
251/144
5,897,119 A * 4/1999 McMillen ............ F16J 15/3236
277/562
(Continued)

FOREIGN PATENT DOCUMENTS

DE          44 01 215 C1    3/1995
DE  10 2011 078 102 A1    12/2012
(Continued)

OTHER PUBLICATIONS

Extended European Search Report dated Dec. 20, 2016, in connection with corresponding EP Application No. 16175891.7 (7 pgs.).

*Primary Examiner* — Matthew W Jellett
(74) *Attorney, Agent, or Firm* — Maier & Maier, PLLC

(57) ABSTRACT

An electromagnetically or electrically operated valve possesses a closing element that is axially displaceable between a closed position and an open position. The closing element is pressure-compensated, by the pressure present on the front side of the closing element being passed to the back side thereof. Between the front and back sides the closing element is sealed radially against a surrounding structural element by means of a dynamic seal. The circumferential sealing gap varies in width in dependence on the axial position of the closing element, so that the dynamic seal seals reliably only in the closed position, while in other positions the static friction of the dynamic seal is reduced.

6 Claims, 3 Drawing Sheets

Figure 1A:
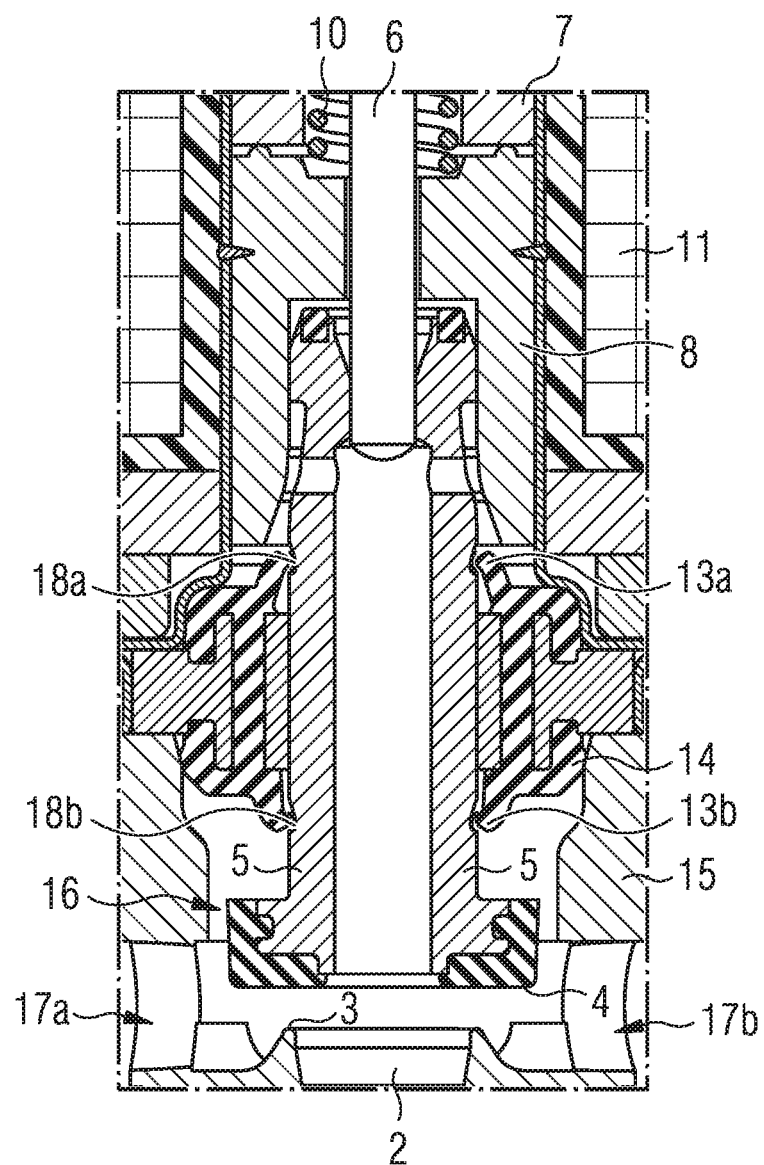

(51) Int. Cl.
*F16F 9/34* (2006.01)
*H01F 7/16* (2006.01)

(52) U.S. Cl.
CPC ........ *F16K 31/0693* (2013.01); *F16K 39/022* (2013.01); *H01F 7/1607* (2013.01)

(58) Field of Classification Search
CPC .... F16J 15/3232; F16J 15/3236; F16J 15/346; F16J 15/3448; F16F 9/36; B60T 8/3615
USPC ................. 251/129.02, 129.07, 129.15, 214; 277/394, 395
See application file for complete search history.

(56) References Cited

U.S. PATENT DOCUMENTS

| | | | | |
|---|---|---|---|---|
| 5,918,856 A | * | 7/1999 | Scharnowski | F16K 31/0658 251/129.07 |
| 6,439,265 B1 | * | 8/2002 | Gruschwitz | B60T 8/363 137/601.14 |
| 7,588,229 B2 | * | 9/2009 | Eiser | B60T 8/363 251/129.02 |
| 7,857,282 B2 | * | 12/2010 | Goossens | B60T 8/363 251/129.02 |
| 7,878,480 B2 | * | 2/2011 | Vattaneo | F01L 9/025 251/129.02 |
| 8,387,946 B2 | * | 3/2013 | Itoafa | F16K 31/0693 251/129.02 |
| 2004/0195778 A1 | * | 10/2004 | Smith | F16C 27/066 277/549 |

FOREIGN PATENT DOCUMENTS

| | | |
|---|---|---|
| DE | 102011078102 A1 | 12/2012 |
| DE | 10 2011 082 007 B3 | 1/2013 |
| DE | 102011082007 B3 | 10/2013 |
| WO | 2007/088043 A1 | 8/2007 |

\* cited by examiner

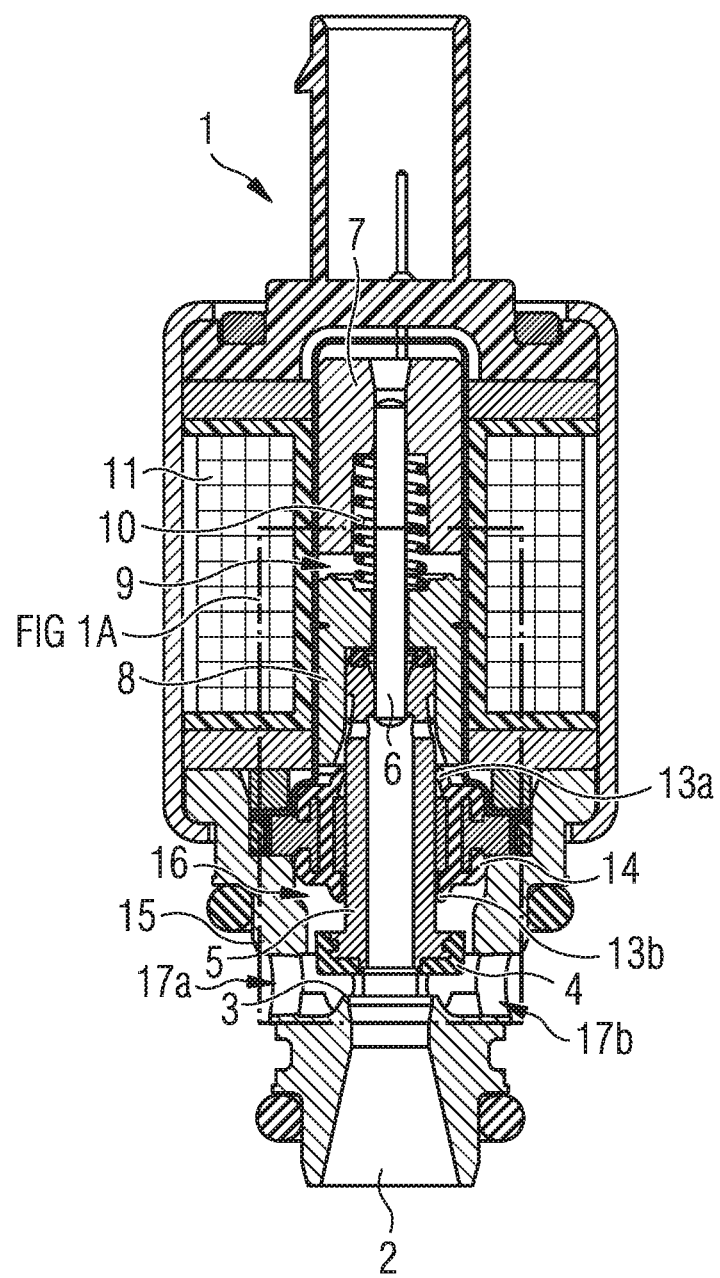

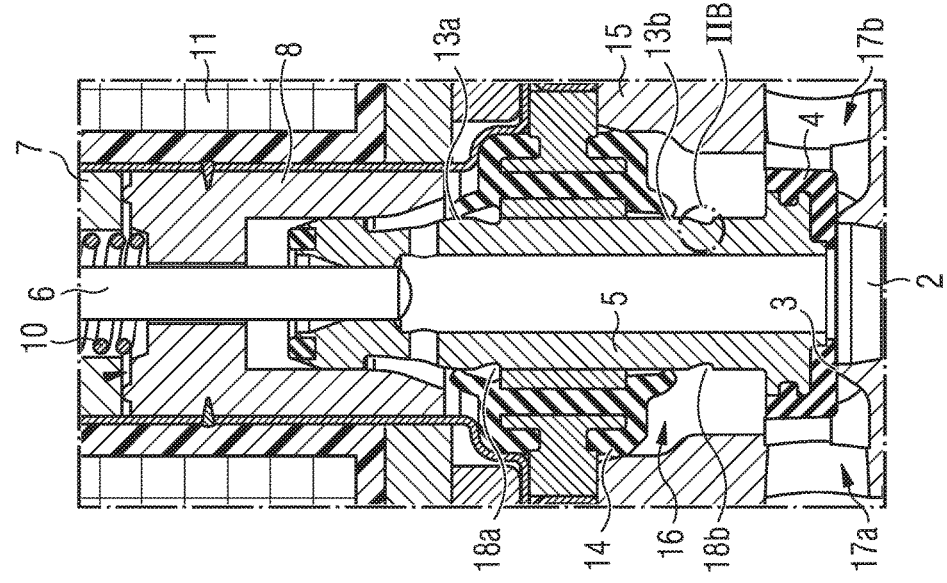
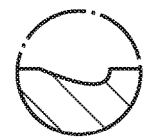
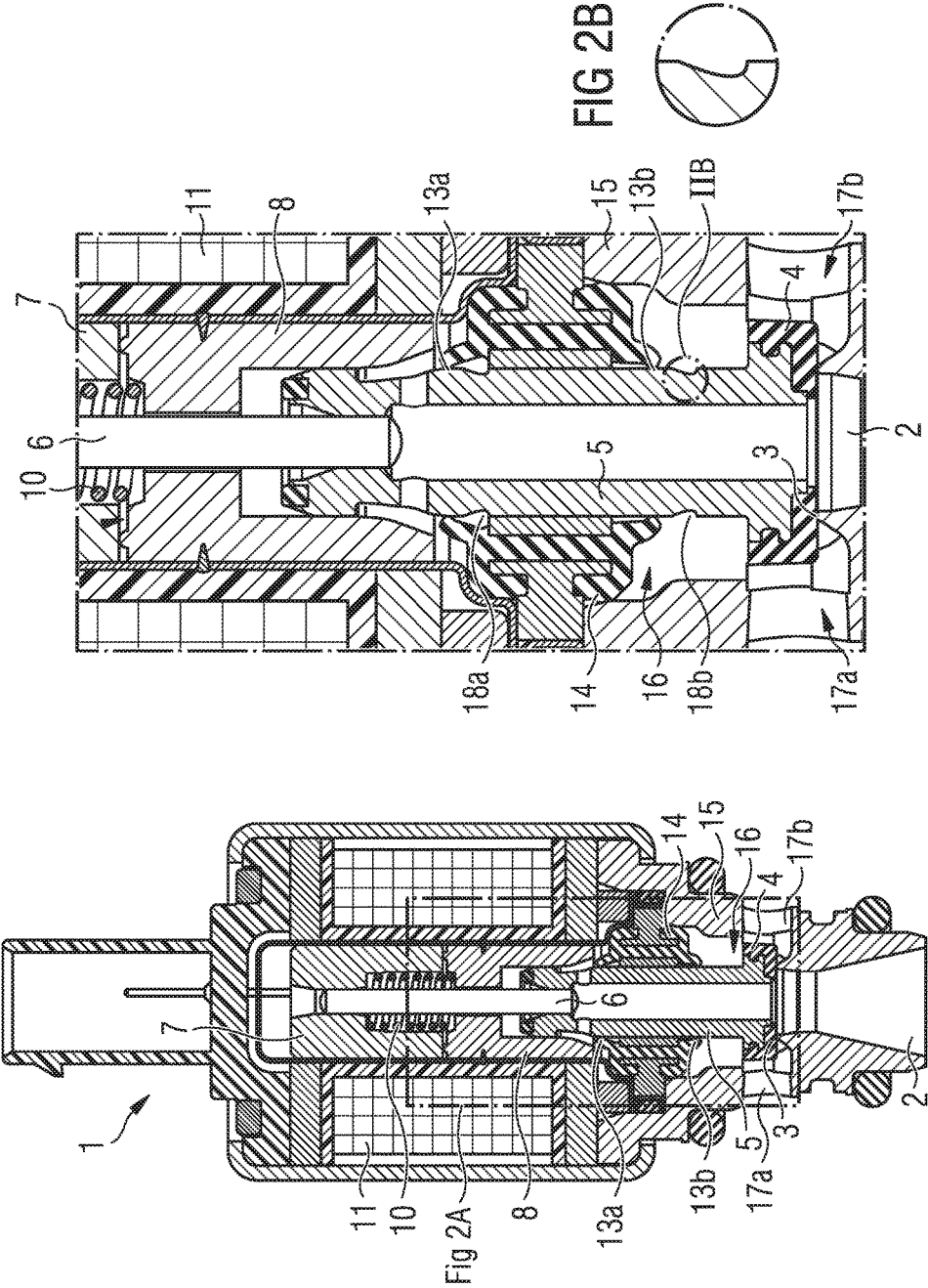

DYNAMIC LIP SEAL AND MOVEABLE SEAL RECESS FOR PRESSURE BALANCE CONTROL OF ELECTRICALLY OPERATED VALVE

The present invention concerns an electrically or electromagnetically operated valve, as finds application for example in automobile air suspension systems.

Valves of the above-mentioned kind are used for a great variety of purposes. They are used for example in different ways and for different functions in air suspension systems of automobiles. There are for example valves for filling and emptying the air spring bellows, valves for connecting or disconnecting accumulators in the system, and valves via which the bellows volumes can be connected to additional volume as needed. Preferably, such valves are operated electromagnetically, as is the seat valve described in the patent DE 10 2011 078 102 A1.

Such valves comprise, inter alia, the three structural elements described more precisely hereinbelow. A first structural element, which acts as a closing element, can assume two positions along an axis, wherein in the first position at least one flow is released, which is blocked in the second position. A second structural element surrounds the first, wherein a sealing gap exists between the two structural elements. The third structural element is a dynamic seal which is arranged in the sealing gap. It provides a mutual radial sealing of the first structural element from the second.

Usually, such valves are constructed as pressure-compensated valves. This means that the pressure present axially on a front side of the closing element is passed onto the axially opposing back side of the closing element. The resulting pressure compensation between the two sides of the closing element facilitates the axial displacement of the closing element, on the one hand, and prevents the uncontrolled displacement of the first element, i.e. the closing element, on the other hand, due to different pressures present on the opposing sides.

In the blocked state of the valve, the dynamic seal separates the pressure present on the front side of the closing element and—due to the pressure compensation—in particular also on the back side thereof from the pressure of that adjacent volume to which the valve blocks the flow.

There are different dynamic seals that are used here. Typical representatives of this kind of seal are tandem seals, Quad Rings or simple O rings. A Quad Ring, unlike an O ring, has an approximately square or X-shaped cross section with two radially exterior and two radially interior, axially spaced-apart sealing lips. A tandem seal, in contrast, comprises a supporting body for an radially interior O ring for sealing inwardly and a radially exterior O ring for sealing outwardly, and can be combined with a sliding ring made of PTFE for example which lies between an O ring and the movable structural part. The sliding ring here performs a guiding function for the movable structural part. To improve the guiding function, there can be used an additional guide ring axially adjacent to the sliding ring. The patent DE 10 2011 082 007 B3 discloses a special tandem seal which comprises a sealing body with two axially spaced, radially exterior sealing lips and two axially spaced, radially interior sealing lips, as well as a supporting body bearing the sealing body.

For the dynamic seal in such valves there are different requirements to be met. Due to the high and fluctuating pressures in the air suspension system, great pressure forces of the seal against the structural parts surrounding it are required in order to guarantee sufficient tightness. Consequently, great actuating forces are required for operating the valves. The drive of such a valve must hence be able to supply a corresponding amount of energy, which in turn leads to large dimensions and a high electrical energy demand. Assemblage of the valves also proves difficult, since a great force is required for biasing the seal.

The object of the present invention is to propose a valve that requires low actuating forces.

This object is achieved according to the invention by an electrically or electromagnetically operated valve having the features of the independent claim 1. Claims dependent thereon state advantageous embodiments and developments of the invention.

According to a preferred embodiment, the valve possesses a sealing gap varying in width in dependence on the axial position of the closing element, wherein the seal radially seals the sealing gap in at least one axial position. Thus, the friction of the dynamic seal with the structural elements surrounding it depends on the axial position of the displaceable first structural element. This has the consequence that the required actuating forces also change proportionally to the friction.

Particularly preferred is an arrangement of the structural elements such that at least a part of a sealing face of the seal is located in a wider region of the sealing gap in the first axial position of the closing element and in a narrower region of the sealing gap in the second position. This guarantees a sealing in the second position, i.e. in the blocked state of the valve. In the first position, in which the valve is open, however, the sealing effect of the dynamic seal is not needed; the seal can therefore be seated in the sealing gap more loosely and thus with reduced friction. Where applicable, no sealing effect is present in the first position.

Moreover, overcoming the static friction out of a rest position requires elevated actuating energy. In the first position this is minimized by the seat of the seal in the wider gap. This in turn has different advantages. Thus, the dimensions and the power of the drive unit can be reduced, while at the same time the valve switching time is faster. The electrical energy demand is lowered. Assemblage of the valve is also simplified, since the bias forces of the seal are reduced in certain regions of the valve.

Preferably, the sealing gap has exactly two different widths in dependence on the axial position of the closing element, one for each of the two positions.

The flow through the valve can have at one end at least one axial flow opening and at another end for example at least one radial flow opening, wherein the closing element effectuates a sealing of the at least one axial flow opening in the second position. Preferably, the valve is a seat valve, but the invention can advantageously also be applied to valves of a different kind, for example slide valves.

Usually, the dynamic seal is fixed stationarily in the valve. Accordingly, the structural element opposing the structural element fixing the seal has at least one, preferably two, circumferential recesses of reduced diameter. Due to the axial fixation of the seal on one structural element, the sealing-gap width can be defined reproducibly in dependence on the axial position of the other structural element.

Preferably, the dynamic seal has two sealing lips which are seated in the two circumferential recesses in the first position and outside the two circumferential recesses in the second position. This guarantees a maximum surface pressure and therefore tightness in the second position, while in the first position the smallest surface pressure and thus also the smallest static friction is present that only has to be overcome (apart from the return spring force) for operating the valve.

Preferably, the valve is an electromagnetically operated valve whose movable armature either forms the first displaceable structural element or is connected thereto.

A single or a plurality of the described electrically operated valves can advantageously be used in an air suspension system of an automobile.

Hereinafter the invention will be presented by way of example with reference to the attached drawings. Therein are shown:

FIG. 1 an electromagnetic seat valve according to a preferred embodiment example in the open state, FIG. 1A an enlarged detail of the valve from FIG. 1, FIG. 2 the valve from FIG. 1 in the blocked state, FIG. 2A again an enlarged detail of the valve from FIG. 2, and FIG. 2B an enlarged representation of a circumferential recess on the plunger.

The seat valve 1 represented in the open state in FIG. 1 and in the blocked state in FIG. 2 possesses a valve opening 2 with a sealing seat 3 which is closable by a sealing element 4. The sealing face of the sealing element 4 is elastically deformable in order to guarantee a reliable sealing of the axial flow opening 2. The sealing element 4 is seated at the front axial end of a plunger 5 which is coupled via a connection rod 6 with a movable magnetic armature 7. It is in principle conceivable to fasten the sealing element 4 immediately to the magnetic armature 7. In the represented embodiment example, however, the plunger 5 is seated firmly on the connection rod 6 which is in turn firmly seated in the magnetic armature 7. This results in a movable structural group consisting of sealing element 4, plunger 5, connection rod 6 and magnetic armature 7. The plunger 5 itself is hollow. Therethrough the pressure present on the front side of the sealing element 4 is passed to the back side of the plunger 5, so that the same pressure is present above a dynamic seal 14 and below the sealing element 4. The plunger 5 is surrounded by a second structural element 15. Together they span a circumferential sealing gap 16 in which the dynamic seal 14 is seated and seals in the radial direction.

The movable magnetic armature 7 is part of an iron circuit to which a stationary pole member 8 also belongs. Between the magnetic armature 7 and the pole member 8 is a working air gap 9 which enables the magnetic armature 7 to move axially toward the pole member 8 when the sealing element 4 is brought into its closed position represented in FIG. 2. In the blocked state the flow between the radial flow openings 17a, 17b and the axial flow opening 2 is prevented by the sealing element 4 closing the sealing seat 3 and the dynamic seal 14 the flow through the plunger 5 itself.

In the open switch position of the valve represented in FIG. 1, the magnetic armature 7 is held spaced from the pole member 8 through mechanical load by means of a spring element 10. As the enlarged representation according to FIG. 1A shows, the two sealing lips 13a, 13b of the dynamic seal 14 are bearing against circumferential recesses 18a, 18b of the plunger 5. This has the consequence that both the sealing effect and the friction are small. In the open state no radial sealing is necessary.

Through electrical energizing of a coil 11 surrounding the magnetic armature 7 and the pole member 8, a magnetic circuit penetrating the magnetic armature 7 and the pole member 8 is generated in such a way that between the pole member 8 and the magnetic armature 7 there acts a magnetic attraction which counteracts the mechanical load of the spring element 10 and overcomes it. The magnetic armature 7 then moves via the working air gap 9 toward the pole member 8, so that the plunger is displaced axially and the sealing element 4 closes the sealing seat 3. The loose seat of the dynamic seal 14 considerably reduces the static friction to be overcome here. For axial displacement of the plunger 5 out of its rest position, comparatively little electrical energy is therefore required. During the closing process the sealing lips 13a, 13b of the dynamic seal 14 are pushed out of the circumferential recesses 18a, 18b of the plunger 5 to a greater diameter, so that the sealing effect of the dynamic seal 14 increases.

In the closed state of the valve 1, both sealing lips 13a, 13b are seated completely outside the circumferential recesses 18a, 18b, as shown in greater detail in FIG. 2A. The dynamic seal 14 thus guarantees a high sealing effect which is required to also block the flow through the pressure-compensated hollow plunger 5. Due to the now increased surface pressure of the sealing lips 13a, 13b on the surface of the plunger 5, the friction, in particular the static friction, increases. However, no electrical energy is required for re-opening the valve 1, since in this respect the axial motion of the plunger 5 can be guaranteed solely by the biased spring element 10.

The invention claimed is:

1. An electrically or electromagnetically operated valve, comprising:
    a first structural element which can assume two positions by displacement along an axis, wherein in a first position at least on flow path is released, which is blocked in a second position,
    a second structural element surrounding the first structural element, wherein a circumferential sealing gap exists between the two structural elements,
    a dynamic seal which is arranged in the sealing gap and slides over a surface of the first structural element upon the axial displacement of the first structural element,
    wherein the dynamic seal is axially fixed on the second structural element, and the first structural element has two circumferential recesses of reduced respectively enlarged diameter, wherein the dynamic seal has two sealing lips which are seated in the two circumferential recesses in the first position and outside the two circumferential recesses in the second position so that the dynamic seal mutually seals the two structural elements radially in at least on axial position of the first structural element.

2. The valve according to claim 1, wherein the valve is a pressure-compensated valve, wherein a pressure present axially on a first side of the first structural element is passed to an axially opposing back side of the first structural element so that a pressure compensation occurs between the front and the back sides of the first structural element.

3. The valve according to claim 1, wherein the sealing gap has exactly two different widths.

4. The valve according to claim 1, wherein the at least one flow path comprises, at one end, at least one axial flow opening, and that the first structural element effectuates a sealing of the at least one axial flow opening in the second position.

5. The valve according to claim 4, wherein the valve is a seat valve.

6. The valve according to claim 1, wherein the valve is an electromagnetically operated valve whose movable armature either forms the first structural element or is connected to the first structural element.

* * * * *